United States Patent

[11] 3,628,783

[72] Inventors Leland F. Blatt
 Grosse Pointe;
 William R. Schreiber, Detroit, both of Mich.
[21] Appl. No. 872,212
[22] Filed Oct. 29, 1969
[45] Patented Dec. 21, 1971
[73] Assignee Leland F. Blatt
 Warren, Mich.

[54] CLAMPS
 6 Claims, 9 Drawing Figs.
[52] U.S. Cl.................................................. 269/91,
 269/198, 269/201, 269/208
[51] Int. Cl..................................................... B23q 3/00,
 B25b 1/14
[50] Field of Search............................................. 269/91, 92,
 93, 201, 198, 228

[56] References Cited
 UNITED STATES PATENTS
3,371,923 3/1968 Blatt............................... 269/228 X

| 2,574,281 | 11/1951 | Olson............................ | 269/228 X |
| 2,699,698 | 1/1955 | Adams........................... | 269/201 |
| FOREIGN PATENTS | | | |
| 643,833 | 1950 | Great Britain................ | 269/201 |

Primary Examiner—Andrew R. Juhasz
Attorney—Cullen, Settle, Sloman & Cantor

ABSTRACT: A push clamp for anchoring a workpiece against a support which includes a slotted body having a bore secured within a base assembly on said support, a plunger reciprocal in said body, a cantilever handle pivoted on the body and a link pivotally interconnecting the handle and plunger, pivotal connections being such that the handle may lock in both forward and retracted positions. The disclosure also includes a frictional lock movably mounted on said plunger operatively engageable by a cam on said link for locking the plunger in forward thrust or retracted positions and for preventing wobble of the plunger.

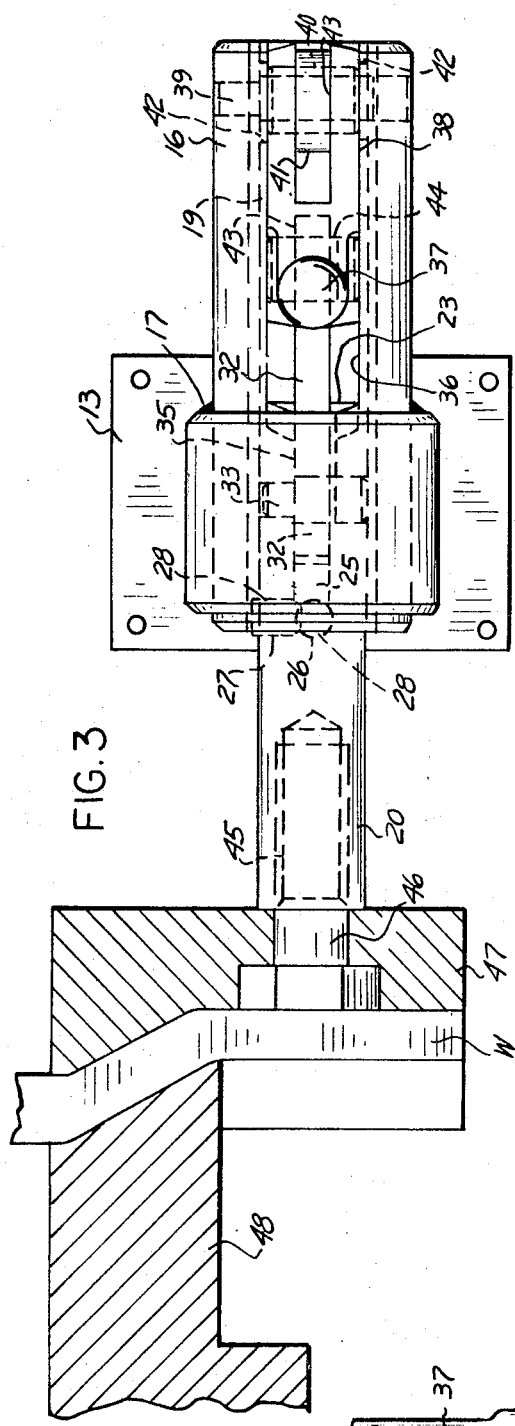
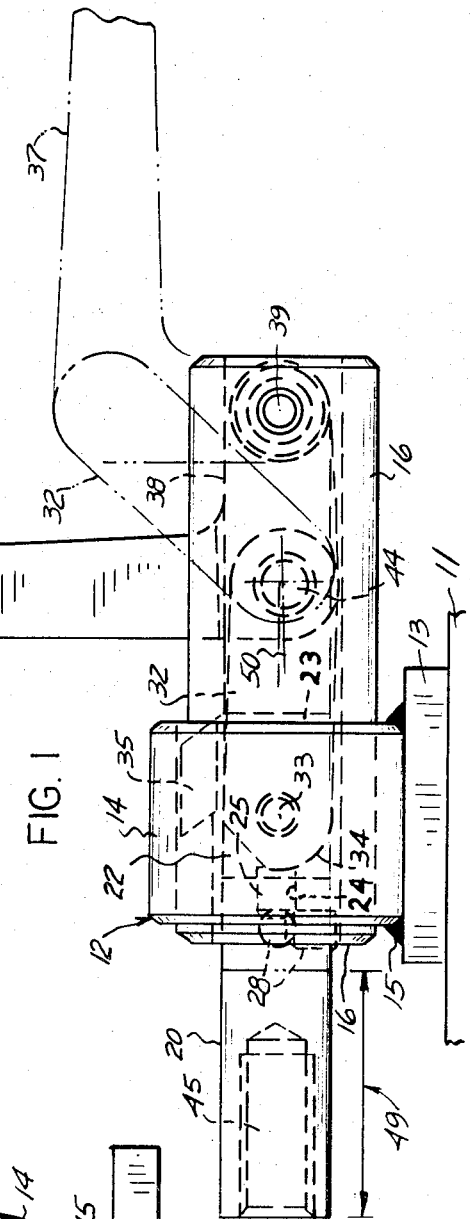
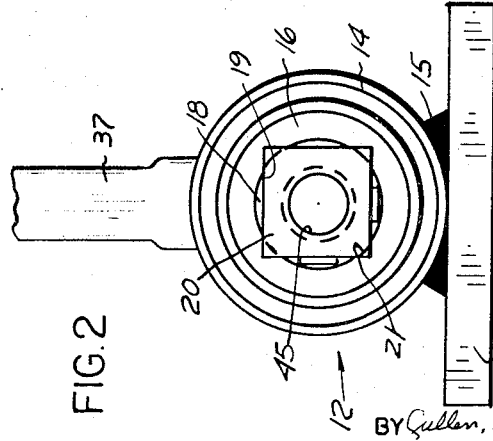

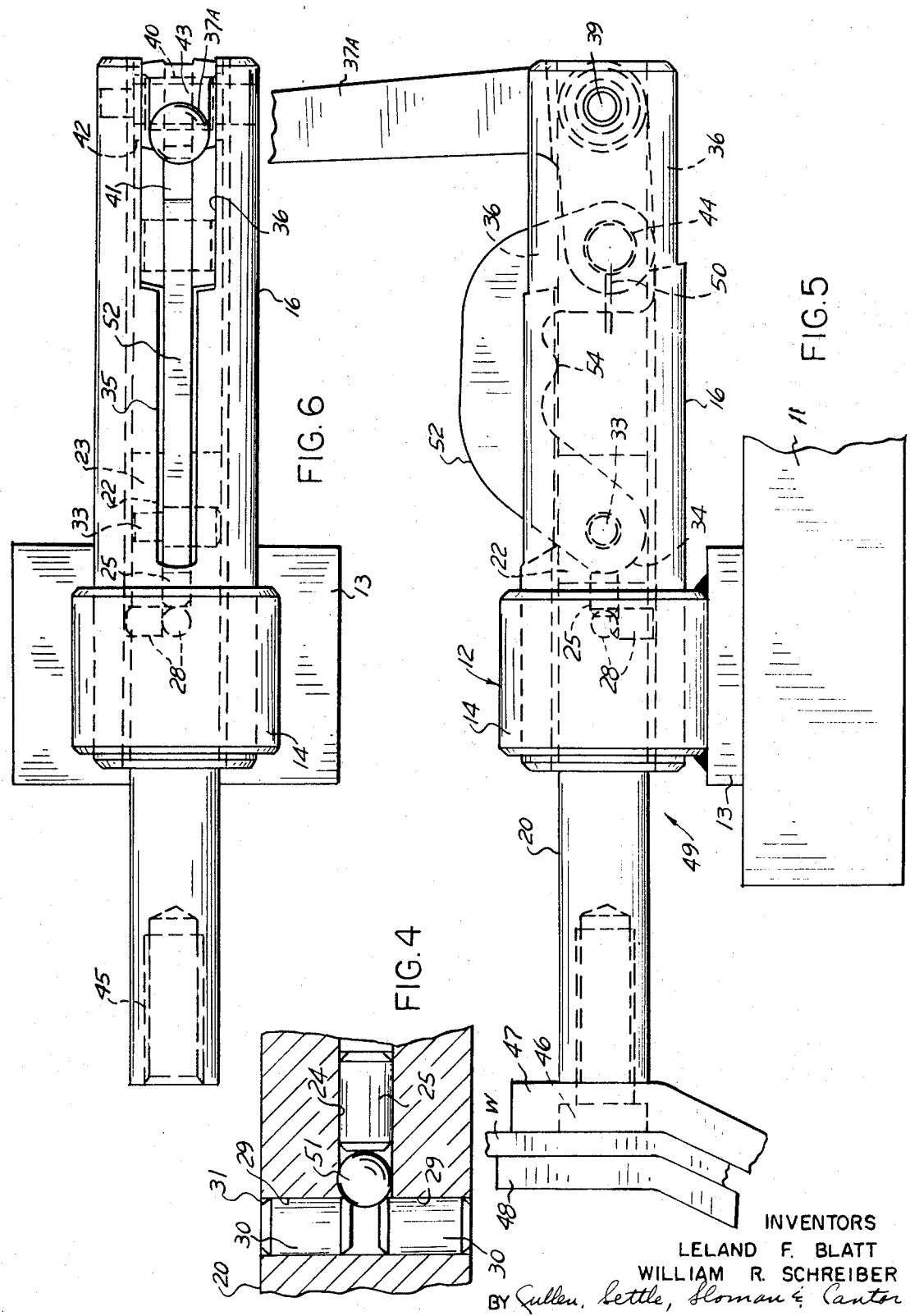

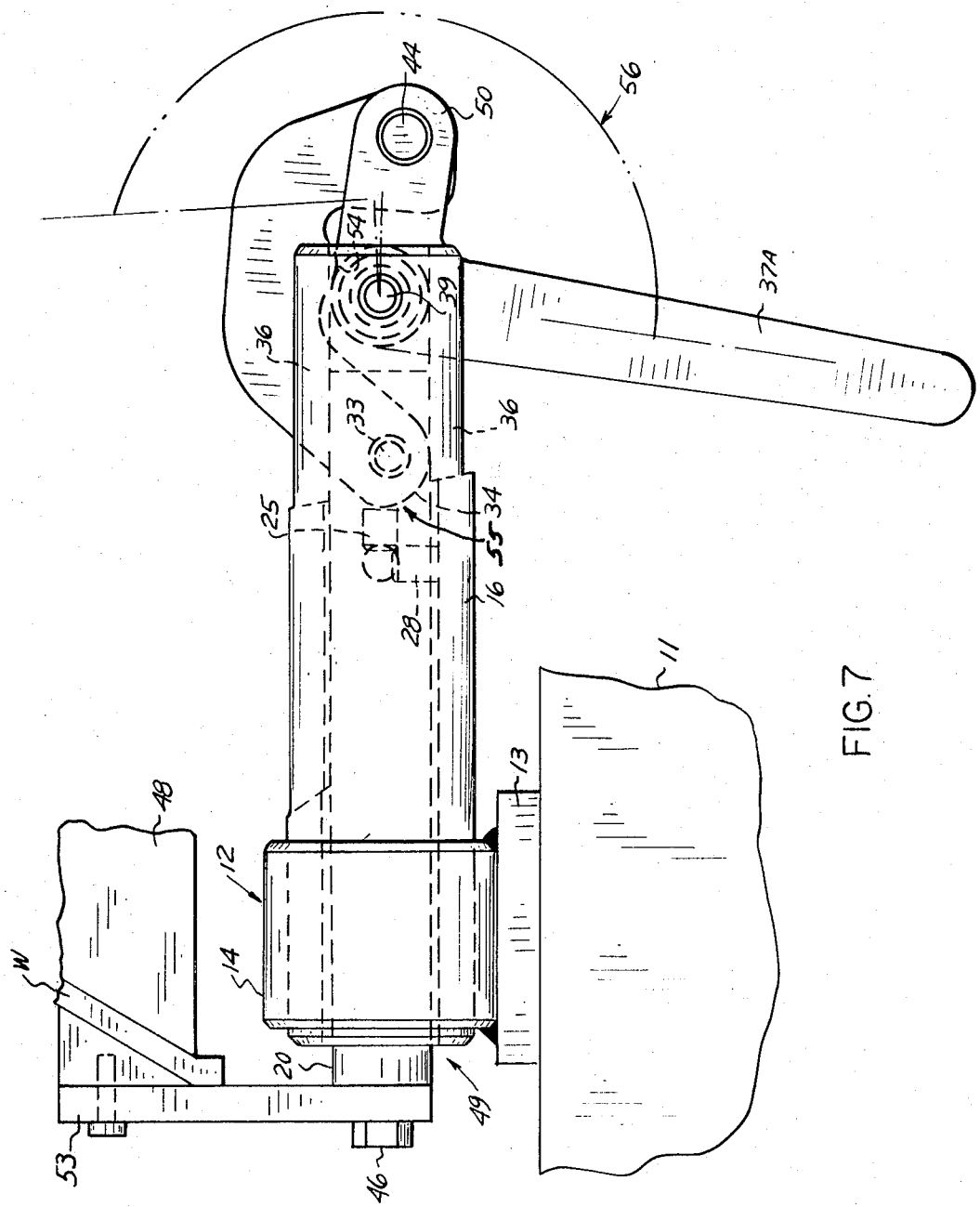

FIG. 9
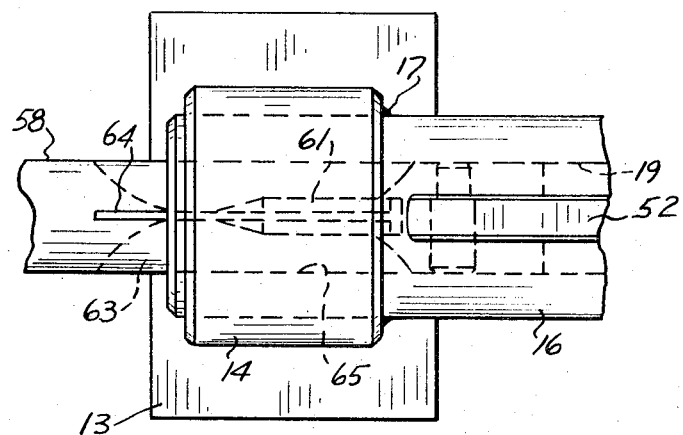
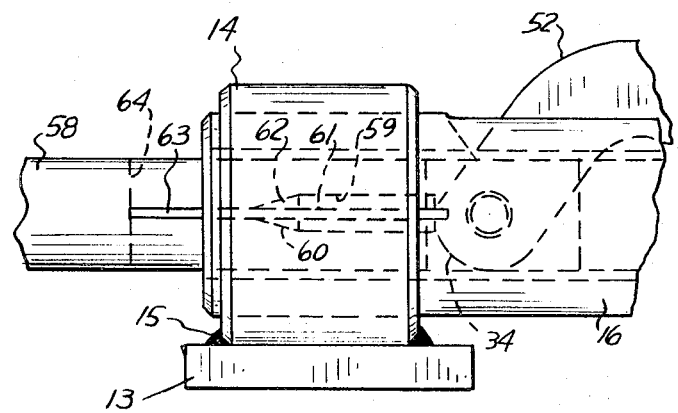
FIG. 8
INVENTORS
LELAND F. BLATT
WILLIAM R. SCHREIBER
BY Cullen, Settle, Sloman & Cantor
ATTORNEYS

CLAMPS

BACKGROUND OF THE INVENTION

Heretofore, various clamp constructions have been provided of an involved and costly nature, designed for the purpose of anchoring a workpiece with respect to a support to permit a machining or welding or other operation thereon.

The difficulty with such clamps heretofore has been involved structural nature and costly construction, the difficulty of arranging the clamping arm at the most convenient angular plane of operation, the difficulty of locking the clamp when in workpiece engaging position, the difficulty of locking a clamp in fully retracted position which may be a secondary workpiece engaging and retaining position and the difficulty of inherent sloppiness in the locking parts.

BRIEF DESCRIPTION OF THE INVENTION

It is an object of the present invention to provide an improved push clamp or push-pull clamp which for its size is capable of exerting extreme holding pressures in the range of 2,500 to 5,000 pounds depending upon proportions and which is of simple construction and which provides mechanism for locking the plunger in work piece securing position and for functioning against wobble of the plunger with respect to its supporting body.

It is another object to provide a modified form of push-pull plunger clamp which is capable of effecting locking movements in either fully advanced or fully retracted positions and which in itself, is capable of self-locking in either of said positions.

These and other objects will be seen from the following specification and claims in conjunction with the appended drawings.

THE DRAWINGS

FIG. 1 is a side elevational view of a plunger clamp with a support fragmentarily shown.

FIG. 2 is an end elevational view thereof.

FIG. 3 is a plan view thereof illustrating clamping position of the plunger with respect to a locator, a backing support and a workpiece fragmentarily shown.

FIG. 4 is a fragmentary elevational section corresponding to FIG. 3 showing a modified arrangement of drive and thrust pins.

FIG. 5 is a side elevational view of a modified push-pull plunger clamp shown in forwardly projected workpiece retaining position, and with the workpiece adapted to be held in a manner the same as shown in FIG. 3.

FIG. 6 is a plan view thereof.

FIG. 7 corresponds to FIG. 5 but showing the plunger clamp in fully retracted pull locking position with the adapter and support and workpiece fragmentarily shown.

FIG. 8 is a fragmentary view corresponding to FIG. 5 but illustrating a different form of thrust pin plunger locking mechanism.

FIG. 9 is a fragmentary plan view thereof.

DETAILED DESCRIPTION OF THE INVENTION

Referring to the drawing, FIGS. 1, 2 and 3, a precision plunger clamp is illustrated mounted upon support 11 fragmentarily shown.

Said clamp comprises a base assembly 12 which includes base 13 securable upon said support and an elongated sleeve 14 secured to said base as by the welds 15.

Elongated body 16 is projected into said sleeve and is rotatively adjustable therein for the purpose of determining the plane of movements of handle 37 afterwhich said body is fixedly secured to sleeve 14 as by the welds 17.

Body 16 has formed therethrough on its longitudinal axis a generally cylindrical bore 18 and superimposed thereon elongated bore 19 of rectangular shape in cross section and which in the illustrative embodiment is square in cross section and is adapted to receive the corresponding shaped elongated reciprocal plunger 20.

Said plunger has its longitudinal corners rounded as at 21, FIG. 2, to improve the sliding cooperation and fit with respect to the bore 19 within which said plunger is guidably positioned.

Said plunger adjacent its inner end as positioned within the body 16; is slotted therethrough at 22 defining bifurcations 23 and includes axial bore 24 adjacent said slot which slidably receives drive pin 25, FIGS. 1 and 3.

Arranged at right angles to the axis of bore 24 are a pair of radial bores 26 and 27 adapted to receive thrust pins 28, FIGS. 1 and 2.

In the illustration of FIG. 3 said thrust pins are arranged at right angles to each other.

In the modified form fragmentarily shown in FIG. 4, the radial bores 29 are in alignment and at right angles to the axis of drive pin 25.

The oppositely arranged thrust pins 30 within the said bores 29 are operably engaged by the ball 51 on longitudinal inward movement of drive pin 25 to thus effect corresponding radial outward movements of the respective thrust pins 30 adapted for operative frictional retaining engagement with the bore of body 16 such as shown in FIG. 3.

Link 32 is positioned between bifurcations 23 of said plunger and pivotally connected thereto by the pivot pin 33. Said link includes cam surface 34 which in a locking position shown in FIG. 1 is in operative engagement with drive pin 25 which in turn effects radial outward locking movements of the thrust pins 28 and 28 entering the bore 18, FIG. 2, for frictional retaining engagement with the interior surface of body 16.

The portion of body 16 adjacent one end includes elongated clearance slot 35 adapted to receive link 32 as it moves from the position shown in FIG. 1 to the dotted line position shown in this FIG.

Slot 35 terminates in the laterally enlarged body slot 36 providing clearance for the handle 37 including cantilever 38.

The cantilever end portion of said handle projects through body slot 36 and into the bore of said body and at one end is pivotally mounted as by pivot pin 39 to said body.

In the illustrative embodiment, pivot pin 39 extends transversely of the longitudinal axis of the body 16.

The central portion of the cantilever element 38 is slotted longitudinally at 43 to receive spacer 41 as well as transverse bushing 40, both of which are mounted upon pivot pin 39 as best shown in FIG. 3.

The opposite end of link 32 extends into cantilever slot 43 and is pivotally connected to said cantilever by the transverse pivot pin 44. Spacers 42 at the ends of bushing 40 are nested within body bore 19.

The forward end of plunger 20 is axially apertured at 45 and interiorly threaded to receive locator nut 46 for securing to said plunger the workpiece adapter or locator 47.

In the fragmentary illustration of FIG, 3, the workpiece W bears against backing 48 which forms a part of or is secured to support 11, FIG. 1.

The reciprocal travel movements of plunger 20 are designated at 49, FIG. 1, said plunger being shown in forwardly extended work-securing position, FIGS. 1 and 3.

The dotted line illustration of handle 37 and link 32 shows the relationship of the parts when said handle has been moved to the release dotted line position shown with link 32 retracted and tilted upwardly to the inclined position shown in FIG. 1.

In the forward solid line locking position of handle 37, FIG. 1, the pivotal connection 44 of the handle with link 32 is shown off center as at 50 with respect to the pivotal connection 33 between said link and plunger and the pivotal connection 39 with respect to said cantilever and body 16. By this construction in the off center location of pivot 44 with respect to pivots 33 and 39, it is seen the plunger 20 is effectively locked in forward work-securing position such as shown in FIG. 3.

In said forwardmost position of said plunger and link 32, FIGS. 1 and 2, link cam 34 in operative engagement with drive pin 25 has effected radial outward movements of the thrust pins 28 for frictional operative and retaining engagement with the interior surface portion of body 16.

Its function is to effectively and further lock said plunger in its extended position with respect to the mounting body; at the same time to eliminate any wobble therebetween due to whatever necessary looseness is required for the sliding fit of said plunger within said body.

On release of the handle 37 to the dotted line release position shown, FIG. 1, pressure of cam 34 is relieved from the said drive pin 25 and thus, pressure is relieved from the radially adjustable thrust pins 28.

MODIFICATION

Modification No. 1:

A modified precision push-pull plunger clamp is illustrated in FIGS. 5 and 6 wherein in many respects, structural parts are similar to those described with respect to FIGS. 1 and 3 and accordingly, a detailed description thereof is not repeated.

It is noted that the primary difference shown in FIGS. 5 and 6 is the form of the link 52 which is of general U-shape as distinguished from the straight link 32 of FIG. 1.

Link 52 has a similar cam end portion 34 corresponding to the cam 34 of link 32 of FIG. 1 and this cam functions in the same manner for effecting axial locking forces upon the corresponding drive pin 25 and the right angularly related thrust pins 28.

A further difference resides in the fact that handle 37A is pivotally mounted by the same pin 39 but is pivotally mounted intermediate its ends whereas in FIG. 1, the handle 37 is pivotally mounted on the same pivot at its end.

Accordingly, link 52 is pivotally connected at one end at 33 to corresponding plunger 20, and at its opposite end is pivotally connected by pivot pin 44 to the end portion of the handle cantilever assembly 37A.

In the push-pull plunger clamp of FIG. 5, slot 36 extends all the way through said body whereas in FIG. 3, the body slot 36 merely communicates with the body bore.

This is required since as shown in FIG. 7, cantilever handle 37A is adapted to swing through an arc of approximately 180°, such arc being shown at 56.

In this construction, the link 52 includes intermediate its ends, the central stop 54 which performs no function in FIG. 5 but in the fully retracted position of handle 37A, FIG. 7, said stop limits such retraction movements by its operative engagement with the pivot assembly 39.

In the fully retracted locking position of lever 37A, FIG. 7, the cam element 34 of said link is again in operative locking engagement with drive pin 25 as shown at 55, FIG. 7 for again, effecting outward radial adjustments of thrust pins 28 for again locking the plunger 20 in the fully retracted position shown and to minimize and prevent wobbling between said plunger and the body within which it is slidably positioned.

Modification No. 2

FIGS. 8 and 9 fragmentarily illustrate a small modification of the push-pull plunger clamp of FIGS. 5 and 6 with he modification residing in the use of a modified plunger 58 corresponding to plunger 20 which adjacent its slotted link engaging portion has an axial slot or bore 59 which corresponds to bore 24, FIG. 3.

Bore 59 has a converging or tapered portion 60 at its forward end and is adapted to receive a similarly shaped thrust pin 61 which to an extent, corresponds to drive pin 25.

Thrust pin 61 is similarly tapered at 62 for operative registry within the taper bore element 60, FIG. 8.

Plunger 58 has a pair of transverse right angularly related slots 63 and 64 which extend therethrough to thus, provide a lateral expansion element as a part of plunger 58. Accordingly, when the cam end portion 34 of link 52 operatively engages thrust pin 61, it effects a longitudinal forward positioning of said thrust pin which acting upon the split central portions of the plunger, effects the lateral expansion thereof sufficient so that the outer sidewall portions of said plunger operatively and frictionally engage corresponding wall portions of the body for locking the plunger in longitudinally adjusted position shown in FIG. 8.

With the link 52 in the retracted locking position corresponding to that shown in FIG. 7, the cam portion of said link again is capable of operative engagement with thrust pin 61 for similarly effecting a locking action or expansion of central portions of the plunger 58 with respect to the body within which the plunger is positioned.

In any event, the locking function of the thrust pin 61 is exactly the same as the corresponding function of the drive pin 25 and the thrust pins 28, such as shown in FIGS. 1, 3, 5 and 6.

Accordingly, the push-pull plunger clamp of FIGS. 8 and 9 is capable of locking either in the forward position shown corresponding to FIG. 5 or in the fully retracted work-securing position corresponding to FIG. 7.

In FIG. 7, locator nut 46 mounts adapter assembly 53 to compressively retain workpiece W against support 48.

Having described our invention, reference should now be had to the following claims.

We claim:

1. A push clamp for anchoring a workpiece against a support comprising;

a base assembly including a base mounted on the support and a sleeve secured to said base and having a longitudinal bore;

an elongated body coaxially projected through said sleeve and secured thereto, and having a bore of rectangular cross section;

there being an outwardly opening slot in said body communicating with its bore and extending along a portion of its length to one end thereof;

a plunger of similar cross section slidably and guidably reciprocal within one end of said body, the plunger at one end projecting from the body adapted to retainingly engage a workpiece;

a handle having a cantilever extension, with the extension movably projecting through said slot into the other end of said body and pivotally mounted upon said body;

and a link at one end pivotally connected to said plunger and at its other end, pivotally connected to said handle;

reciprocal pivotal movements of said handle adapted to project and retract said plunger respectively;

said plunger having an axial bore and a pair of radial bores communicating therewith and extending at right angles to said axial bore;

a drive pin in said bore;

a thrust pin in each radial bore engageable with said drive pin;

and cam means on one end of said link operatively engageable with said drive pin when said handle is fully closed for effecting outward radial movements of said thrust pins for frictional retaining engagement with said body locking the plunger in work-holding position and eliminating wobble of the plunger in said body.

2. A push clamp for anchoring a workpiece against a support comprising:

a base assembly including a base mounted on the support and a sleeve secured to said base and having a longitudinal bore;

an elongated body coaxially projected through said sleeve and secured thereto, and having a bore of rectangular cross section;

there being an outwardly opening slot in said body communicating with its bore and extending along a portion of its length to one end thereof;

a plunger of similar cross section slidably and guidably reciprocal within one end of said body, the plunger at one end projecting from the body adapted to retainingly engage a workpiece;

a handle having a cantilever extension, with the extension movably projecting through said slot into the other end of said body and pivotally mounted upon said body;

and a link at one end pivotally connected to said plunger and at its other end, pivotally connected to said handle;

reciprocal pivotal movements of said handle adapted to project and retract said plunger respectively;

said body outwardly opening slot extending transversely therethrough;

said handle being pivotally mounted intermediate its ends upon said body and adapted to swing 180° approximately from one extreme locking position to the other extreme locking position;

said link being of general U-shape, and a stop projecting from one side of said link adapted to retainingly engage said handle pivotal mounting for limiting the outward swing of said handle at one extreme locking position.

3. A push clamp for anchoring a workpiece against a support comprising;

a base assembly including a base mounted on the support and a sleeve secured to said base and having a longitudinal bore;

an elongated body coaxially projected through said sleeve and secured thereto, and having a bore of rectangular cross section;

there being an outwardly opening slot in said body communicating with its bore and extending along a portion of its length to one end thereof;

a plunger of similar cross section slidably and guidably reciprocal within one end of said body, the plunger at one end projecting from the body adapted to retainingly engage a workpiece;

a handle having a cantilever extension, with the extension movably projecting through said slot into the other end of said body and pivotally mounted upon said body;

and a link at one end pivotally connected to said plunger and at its other end, pivotally connected to said handle;

reciprocal pivotal movements of said handle adapted to project and retract said plunger respectively;

said plunger having an axial bore tapered inwardly at one end;

portions of said plunger having right angularly related slots therethrough, communicating with said axial bore;

and a thrust pin similarly tapered at one end and projecting into said plunger bore;

and cam means on one end of said link operatively engageable with said thrust pin when the handle is fully closed for effecting radial expansion of portions of said plunger into frictional retaining engagement with said body.

4. In the clamp of claim 1, a ball in said plunger bore interposed between the respective inner ends of said drive pin and thrust pins.

5. In the clamp of claim 2, said plunger having an axial bore and a pair of radial bores communicating therewith and extending at right angles to said axial bore;

a drive pin in said axial bore;

a thrust pin in each radial bore engageable with said drive pin;

and cam means on one end of said link operatively engageable with said drive pin when said handle is fully closed for effecting outward radial movement of said thrust pins for frictional retaining engagement with said body locking the plunger in work-holding position and eliminating wobble of the plunger in said body.

6. In the clamp of claim 5, said link cam means on full retraction of said handle operatively engageable with said drive pin for effecting outward radial movements of said thrust pins for frictional retaining engagement with said body, locking the plunger in work-holding retracted position.

* * * * *